United States Patent
Guerriero et al.

(10) Patent No.: US 10,275,402 B2
(45) Date of Patent: Apr. 30, 2019

(54) SYSTEMS AND METHODS TO PROVIDE PIPELINE DAMAGE ALERTS

(71) Applicant: General Electric Company, Schenectady, NY (US)

(72) Inventors: Marco Guerriero, Niskayuna, NY (US); Frederick Wilson Wheeler, Waukesha, WI (US); Glen Peter Koste, Niskayuna, NY (US); Sachin Narahari Dekate, Niskayuna, NY (US); Peter Henry Tu, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 99 days.

(21) Appl. No.: 14/854,828

(22) Filed: Sep. 15, 2015

(65) Prior Publication Data

US 2017/0076563 A1    Mar. 16, 2017

(51) Int. Cl.
| | |
|---|---|
| G08B 5/36 | (2006.01) |
| G06F 16/245 | (2019.01) |
| F17D 5/06 | (2006.01) |
| G01M 3/00 | (2006.01) |
| G01M 3/24 | (2006.01) |
| G01M 3/28 | (2006.01) |

(52) U.S. Cl.
CPC ............ *G06F 16/245* (2019.01); *F17D 5/06* (2013.01); *G01M 3/002* (2013.01); *G01M 3/243* (2013.01); *G01M 3/2807* (2013.01)

(58) Field of Classification Search
CPC ... G08B 5/36; G08B 21/187; G06F 17/30424; G01M 3/2807; G01M 3/18; G01N 27/83; F17D 5/06
See application file for complete search history.

(56) References Cited

U.S. PATENT DOCUMENTS

| | | |
|---|---|---|
| 5,355,324 A | 10/1994 | Zhang |
| 6,725,705 B1 | 4/2004 | Huebler et al. |

(Continued)

FOREIGN PATENT DOCUMENTS

| | | |
|---|---|---|
| EP | 2 352 002 A1 | 8/2011 |
| JP | 5297951 B2 | 9/2013 |

(Continued)

OTHER PUBLICATIONS

Perera, A. G. Amitha et al., "Bayesian Object-Level Change Detection in Grayscale Imagery", Proceedings of the 17th International Conference on Pattern Recognition (ICPR'04), vol. 1, Aug. 23-26, 2014, IEEE Computer Society, 5pages).

(Continued)

*Primary Examiner* — An T Nguyen
(74) *Attorney, Agent, or Firm* — GE Global Patent Operation

(57) ABSTRACT

According to some embodiments, a signal processing unit may receive distributed acoustic sensing data associated with a first set of a plurality of pipeline locations. The signal processing unit may also receive collected physical data representing a physical characteristic of a second set of a plurality of pipeline locations. The signal processing unit may then utilize a pipeline model having the distributed acoustic sensing data and collected physical data as inputs to automatically generate at least one alert indicating an increased probability of damage to the pipeline.

23 Claims, 14 Drawing Sheets

(56) References Cited

U.S. PATENT DOCUMENTS

| | | | |
|---|---|---|---|
| 6,970,808 B2 | 11/2005 | Abhulimen et al. | |
| 7,526,944 B2 | 5/2009 | Sabata et al. | |
| 2005/0038825 A1* | 2/2005 | Tarabzouni | G06F 17/30241 |
| 2006/0225507 A1* | 10/2006 | Paulson | F17D 5/02 |
| | | | 73/592 |
| 2007/0041333 A1* | 2/2007 | Twitchell, Jr. | F17D 5/06 |
| | | | 370/252 |
| 2007/0043807 A1* | 2/2007 | Twitchell, Jr. | H04L 67/125 |
| | | | 709/201 |
| 2007/0183604 A1* | 8/2007 | Araki | G10L 17/26 |
| | | | 381/58 |
| 2007/0236343 A1* | 10/2007 | Becksted | G08B 13/19695 |
| | | | 340/521 |
| 2008/0036593 A1 | 2/2008 | Rose-Phrsson et al. | |
| 2008/0210024 A1* | 9/2008 | Merlo | G01M 3/047 |
| | | | 73/865.8 |
| 2009/0105969 A1* | 4/2009 | Saylor | G01D 9/005 |
| | | | 702/47 |
| 2010/0027235 A1* | 2/2010 | Samuelson | F17D 5/06 |
| | | | 361/816 |
| 2011/0069302 A1* | 3/2011 | Hill | G01V 1/186 |
| | | | 356/73.1 |
| 2011/0178726 A1* | 7/2011 | Dobbs | G01B 15/02 |
| | | | 702/35 |
| 2012/0185184 A1* | 7/2012 | Armon | G01D 4/002 |
| | | | 702/51 |
| 2012/0209653 A1* | 8/2012 | Andoji | G06Q 10/0639 |
| | | | 705/7.26 |
| 2014/0000348 A1* | 1/2014 | Calvanese Strinati | G01M 3/18 |
| | | | 73/40.5 R |
| 2014/0139841 A1 | 5/2014 | Koste et al. | |
| 2014/0207430 A1 | 7/2014 | Li et al. | |
| 2015/0054650 A1 | 2/2015 | Frish | |
| 2015/0112647 A1* | 4/2015 | Currin | G06Q 50/06 |
| | | | 703/1 |
| 2015/0192488 A1* | 7/2015 | Xu | B63C 11/40 |
| | | | 702/38 |
| 2015/0199846 A1* | 7/2015 | Sanderson | G06T 11/206 |
| | | | 703/11 |
| 2016/0098037 A1* | 4/2016 | Zornio | G05B 19/41855 |
| | | | 700/20 |
| 2016/0144959 A1* | 5/2016 | Meffert | B64C 39/024 |
| | | | 701/3 |
| 2016/0252481 A1* | 9/2016 | Zheng | G01M 3/40 |
| | | | 324/238 |
| 2016/0356665 A1* | 12/2016 | Felemban | G01M 3/2807 |
| 2016/0356666 A1* | 12/2016 | Bilal | G01M 3/2815 |

FOREIGN PATENT DOCUMENTS

| | | |
|---|---|---|
| NZ | 245007 A | 5/1996 |
| WO | 2013/169239 A1 | 11/2013 |
| WO | 2014/115399 A1 | 7/2014 |
| WO | 2014/142825 A1 | 9/2014 |

OTHER PUBLICATIONS

Godfrey, Alastair et al., "Pipeline Leak Detection Using Four Mode Fibre-Optic Based Distributed Sensing", Proceedings of the 2014 10th International Pipeline Conference, IPC 2014-33083, Sep. 29-Oct. 3, 2014, Calgary, Alberta, Canada, Downloaded from: http://proceedings.asmedigitalcollection.asme.org/ on Sep. 15, 2015, (pp. 1-10, 10 total pages).

Doretto et al., "Region Moments: Fast Invariant Descriptors for Detecting Small Image Structures", Computer Vision and Pattern Recognition (CVPR), IEEE Conference, San Francisco, pp. 3019-3026, Jun. 13-18, 2010.

Moustakides et al., "Joint Detection and Estimation: Optimum Tests and Applications", IEEE Transactions on Information Theory, vol. No. 58, Issue No. 7, pp. 4215-4229, Jul. 2012.

Williams, "Distributed Acoustic Sensing for Pipeline Monitoring", Pipeline and Gas Journal, vol. No. 239, Issue No. 7, 6 pages, Jul. 2012.

"Leak Detection Study—DTPH56-11-D-000001", US Department of Transportation Pipeline and Hazardous Materials Safety Administration, 281 pages, Dec. 10, 2012.

* cited by examiner

SYSTEMS AND METHODS TO PROVIDE PIPELINE DAMAGE ALERTS

BACKGROUND

Pipelines may be used to transport a substance from one location to another. For example, a pipeline may be used to transport propane gas from one location to another location hundreds of miles away. At any given time, various portions of a pipeline may be at risk of malfunctioning, either due to corrosion, mechanical damage, equipment failures, etc. As a result, an enterprise operating a pipeline may need to manage the pipeline to fix anomalies as they arise and/or prevent problems before they occur. For example, an enterprise might notice a construction crew has begun working near the pipeline and dispatch a person to the site to ensure that the construction does not damage the pipeline. Manually monitoring these various pipeline risks, however, can be a time consuming, difficult, and error prone process—especially when there are a large number of pipeline locations (e.g., a pipeline could be hundreds of miles long). Moreover, it can be difficult for a user to visualize physical pipeline locations and various types of risk, especially when there are a substantial number of pipeline segments and/or pipeline assets (or even when an enterprise is operating multiple pipelines). It would therefore be desirable to provide systems and methods to provide intelligent pipeline management alarms and/or alerts in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
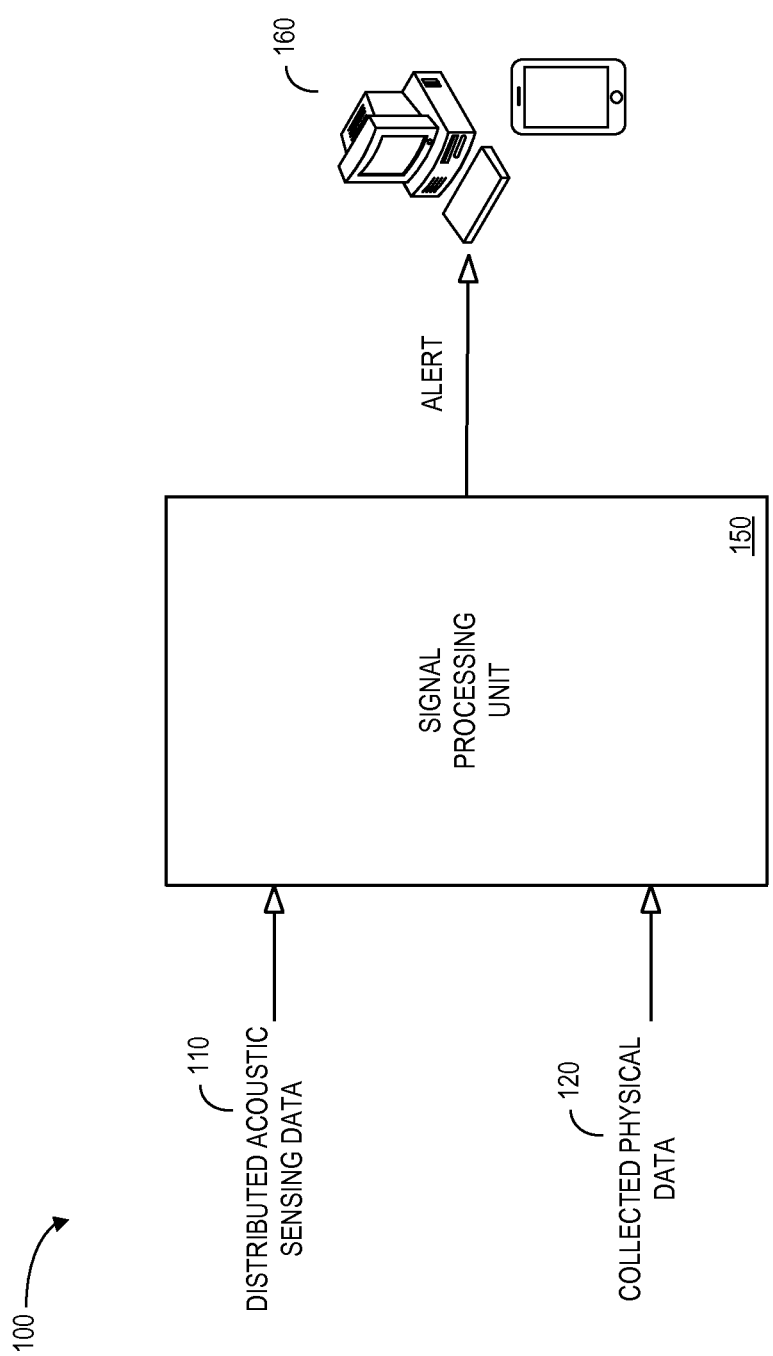
FIG. 1 is a high-level architecture of a system in accordance with some embodiments.

FIG. 1 is a high-level architecture of a system 100 in accordance with some embodiments. The system 100 includes data sources 110, 120 that provide information to a signal processing unit 150. The data sources 110, 120 might include, distributed acoustic sensing data and collected physical data about the pipeline and/or a substance being transported via the pipeline. According to some embodiments, a pipeline database may store current and/or historical information about one or more pipelines and/or segments of a pipeline. According to some embodiments, a data source may include information about subsystem assets, such as pipeline compressor station conditions, main line valve states, temperature, pressure, and flows, etc. Various data sources may further include geographic information, such as map data, topographical data, etc. According to some embodiments, the geographic information may be associated with satellite data and/or a Geographic Information System ("GIS") that captures, stores, manipulates, analyzes, manages, and/or presents various types of spatial or geographical data. Various data sources may also include risk parameter information, including weather and seismic related risk parameters.

The signal processing unit 150 may, according to some embodiments, access the data sources 110, 120, and utilize a pipeline model to automatically create an alert (e.g., associated with risk prediction, leak detection, or excavation damage threat) that may be transmitted to various user platforms 160 as appropriate. As used herein, the term "automatically" may refer to, for example, actions that can be performed with little or no human intervention.

As used herein, devices, including those associated with the system 100 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The signal processing unit 150 may store information into and/or retrieve information from various data sources and/or user platforms 160. The various data sources may be locally stored or reside remote from the signal processing unit 150. Although a single signal processing unit 150 is shown in FIG. 1, any number of such devices may be included. Moreover, various devices described herein might be combined according to embodiments of the present invention. For example, in some embodiments, the signal processing unit 150 and one or more data sources might comprise a single apparatus. The signal processing unit 150 function may be performed by a constellation of networked apparatuses, in a distributed processing or cloud-based architecture.

Figure 2:
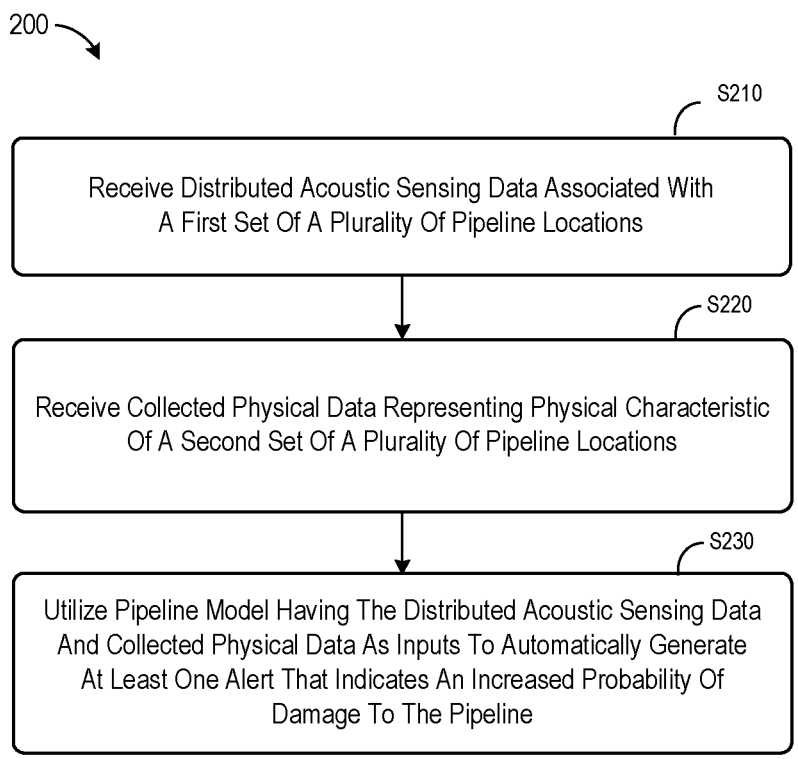
FIG. 2 illustrates a method that might be performed according to some embodiments.

A user may access the system 100 via one of the user platforms 120 (e.g., a personal computer, tablet, or smartphone) to view information about and/or manage a pipeline in an automatic and accurate manner in accordance with any of the embodiments described herein. For example, FIG. 2 illustrates a method 200 that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a signal processing unit may receive distributed acoustic sensing data associated with a first set of a plurality of pipeline locations. The pipeline might transport, for example, a gas (such as methane, propane, or butane), a liquid (such as crude or refined oil), or a combination of liquids, gases, and/or solids (such as is produced from a production well). As used herein, the phrase "pipeline location" may refer to, for example, an actual pipe or anything associated with a pipeline, such as a compressor station, a main line valve, a fiber sensing cable buried near the pipeline, and/or a pipeline meter. The distributed acoustic sensing data may be, for example, based on signals received via optical fibers or geophones and processed by an edge processing device.

At S220, the signal processing unit may receive collected physical data representing a physical characteristic of a second set of a plurality of pipeline locations. The second set of locations may be a subset of the first set of locations, a superset of the first set of locations, or a portion of locations in common with the first set of locations. At S230, the signal processing unit may utilize a pipeline model (having the distributed acoustic sensing data and collected physical data as inputs) to automatically generate at least one alert indicating an increased probability of damage to the pipeline and/or a leak. According to some embodiments, the alert may include a likelihood of damage and/or a predicted pipeline location associated with damage. The pipeline model might comprise, for example a predictive model and may include one or more neural networks, Bayesian networks (such as Hidden Markov models), expert systems, decision trees, collections of decision trees, support vector machines, or other systems known in the art for addressing problems with large numbers of variables. According to some embodiments, the model(s) are trained on prior data and outcomes known to the pipeline enterprise. The specific data and outcomes analyzed may vary depending on the desired inputs and/or functionality of the particular predictive model. The particular data parameters selected for analysis in the training process might be determined using regression analysis and/or other statistical techniques known in the art for identifying relevant variables in multivariable systems.

According to some embodiments, a mapping module may automatically determine location information associated with each of the plurality of pipeline location. As used herein, the phrase "location information" might refer to, for example, pixels (e.g., a location on a display monitor), coordinates, latitudes and longitudes, Global Positioning System ("GPS") information, distances (e.g., along the pipeline), and/or GIS data.

According to some embodiments, an analytic module, having access to historical pipeline information, may generate predictive risk information associated with at least one of the pipeline locations. The predictive risk value might be, for example, based at least in part on a volume of substance transported via the at least one pipeline portion. For example, if prior compressor stations have typically failed after transported a certain amount of gas the analytic module might predict that a compressor station in a pipeline is likely to fail in the near future. The predictive risk information might be output as a value, a category (e.g., "high" or "low" risk), a percentage (representing a likelihood of failure), and/or a color (e.g., with "green" indicating low risk, "yellow" indicating moderate risk, and "red" indicating high risk). A risk parameter might be associated with, for example, a corrosion pipeline wall thickness loss, a pressure change, weather and flood risk, earthquake risk, mechanical damage, and/or pipeline dent risk. The analytic module, having access to historical pipeline information, may generate alerts indication probable leaks or bursts in the pipeline, or the threat of imminent damage due to construction activity near a pipeline.

Figure 3:
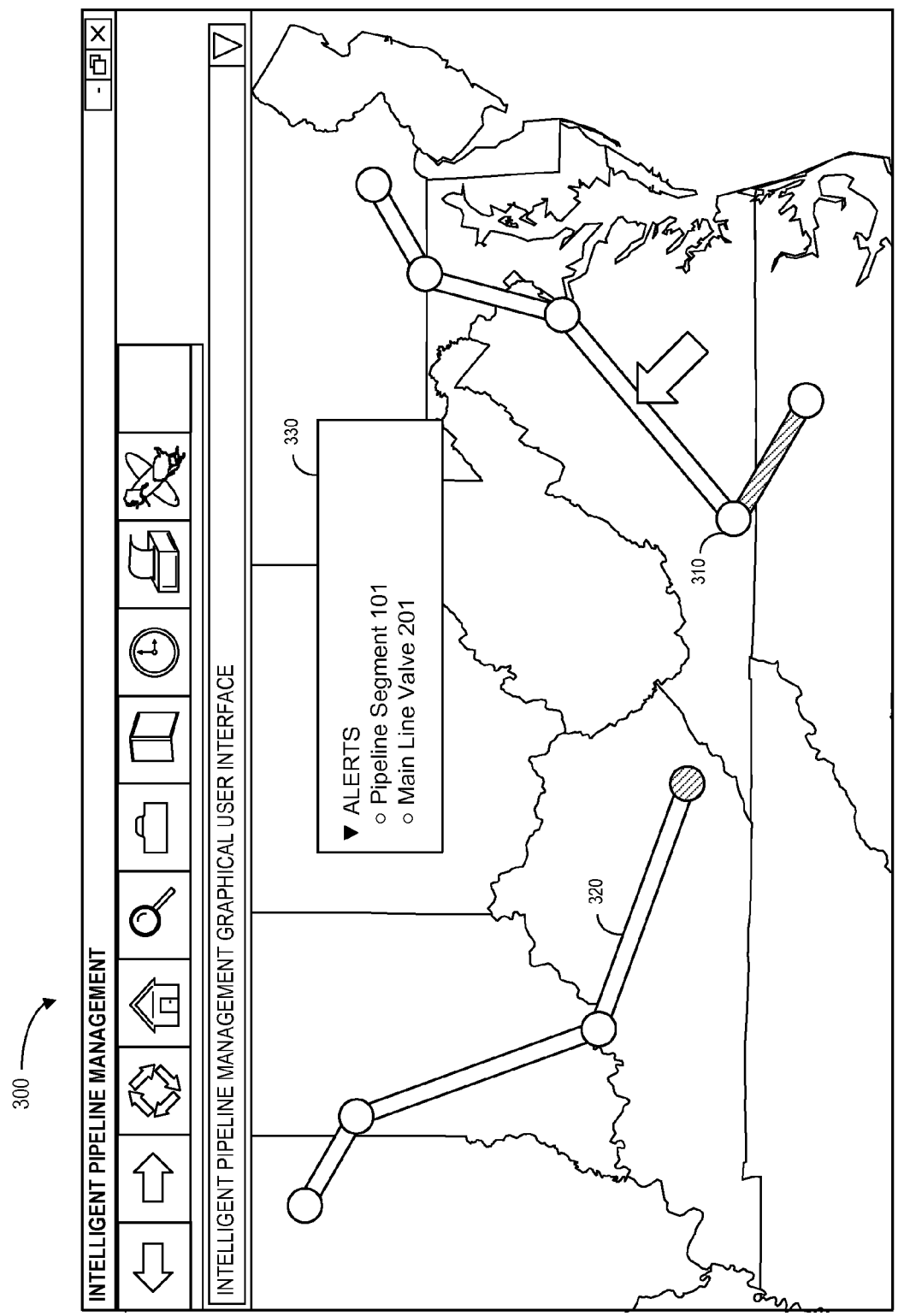
FIG. 3 illustrates an intelligent pipeline management graphical user interface display according to some embodiments.

According to some embodiments, a Graphical User Interface ("GUI") module having access to real world map information may arrange to transmit information creating for a user a visual representation of the pipeline, including information about the current status of at least one pipeline location and/or and alert, on a GUI map display in accordance with the location information. For example, FIG. 3 illustrates a GUI map display 300 including pipeline subsystems 310, segments 320 and a pipeline alert 330. The GUI map display 300 may further include, for example, topographical information, a geographic feature (e.g., a mountain, ravine, or lake), street information, population information, weather information, seismic information, building information, and/or predicted impact radius information. Note that the information generated by the GUI module may be adapted to create the visual representation in accordance with a number of different display platforms, including different types of hardware configurations, Operating Systems ("OS"), etc.

Figure 4:
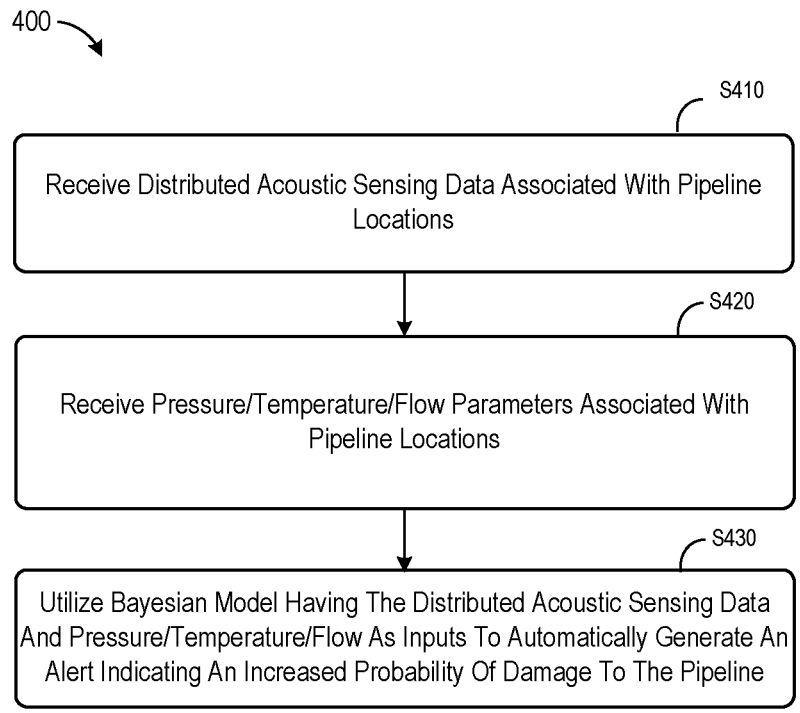
FIG. 4 illustrates a physical characteristic of a substance method in accordance with some embodiments.

In some cases, a pipeline may be adapted to transport a liquid or a gas. In this case, a physical characteristic of the substance might be used as the collected physical data input to the pipeline model. For example, FIG. 4 illustrates a physical characteristic of a substance method in accordance with some embodiments. As before, at S410 a signal processing unit may receive distributed acoustic sensing data associated with a first set of a plurality of pipeline locations. The pipeline might transport, for example, a gas (such as methane) or a liquid (such as crude or refined oil).

At S420, the signal processing unit may receive collected physical data representing pressure, temperature, and/or flow associated with the substance being transported. At S430, the signal processing unit may utilize a Bayesian model (having the distributed acoustic sensing data and pressure, temperature, and/or flow data as inputs) to automatically generate at least one alert indicating an increased probability of damage to the pipeline. According to some embodiments, the alert may include a likelihood of damage and/or a predicted pipeline location associated with damage.

Figure 5:
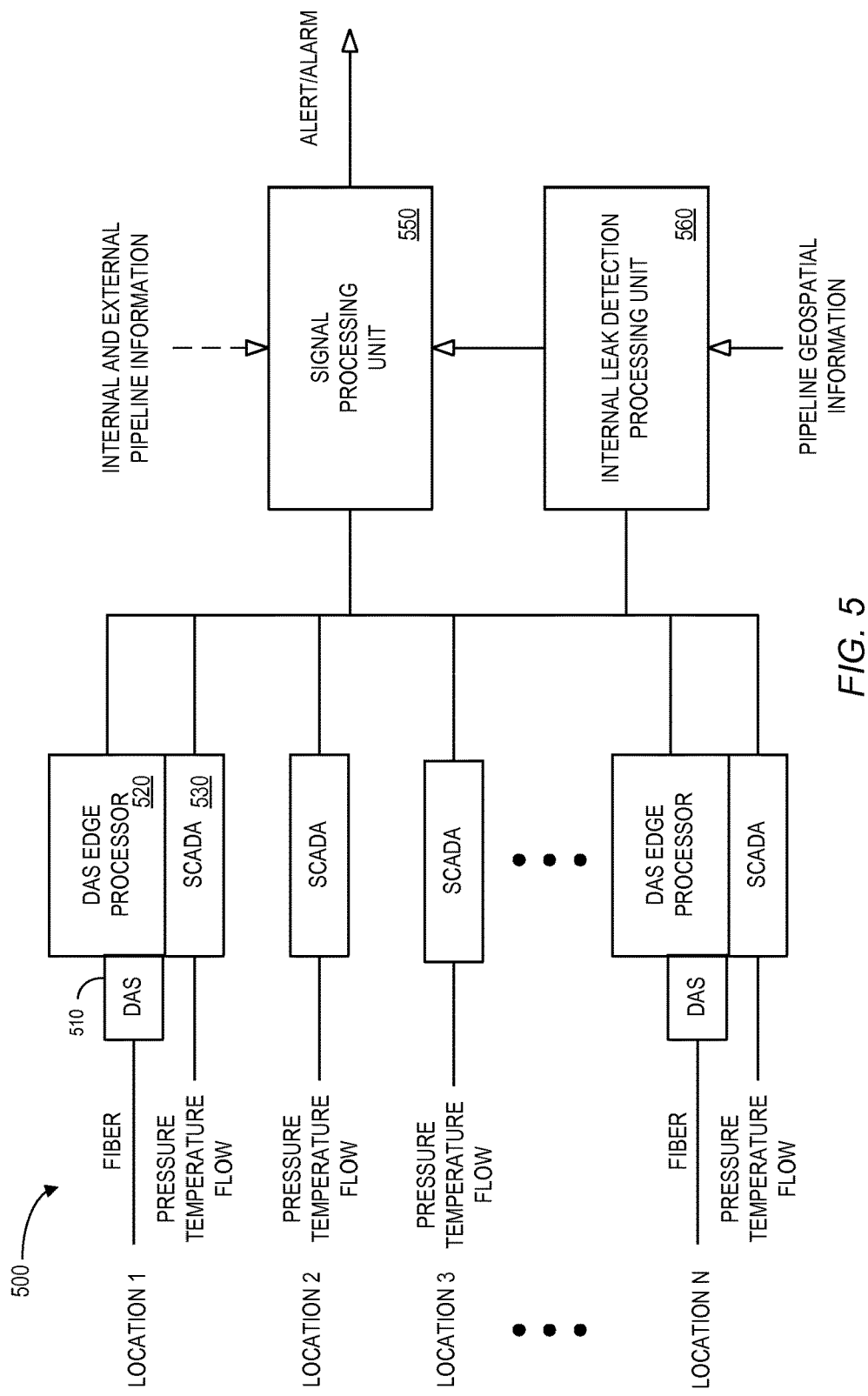
FIG. 5 illustrates a data network system according to some embodiments.

According to some embodiments, the physical data is processed by a Supervisory Control And Data Acquisition ("SCADA") device prior to being received by the signal processing unit. As used herein, the term SCADA may refer to, for example, a system operating with coded signals over communication channels so as to provide control of remote equipment (e.g., using one communication channel per remote station). The control system may be combined with a data acquisition and storage system, according to some embodiments, by adding the use of coded signals over communication channels to acquire information about the status of the remote equipment According to some embodiments, the physical data is analyzed based at least in part on geospatial information describing the pipeline and a substance simulation algorithm associated with an internal leak detection system. Consider, for example, FIG. 5 which illustrates a data network system 500 according to some embodiments. The system 500 includes a distributed acoustic sensing device 510 that collects acoustic information from locations via fibers. A digital acoustic sensing edge device 520 may transmit information to a remote signal processing unit 550 (which may also receive internal and external pipeline information). Moreover, SCADA devices 530 may process pressure, temperature, and/or flow parameters to be received at an Internal Leak Detection ("ILD") processing unit 560. Note that, as illustrated in FIG. 5, locations 1 through N might each be associated with acoustic information, collected physical data, or both acoustic information and collected physical data.

The ILD processing unit 560 might also receive pipeline geospatial information, such as data describing the physical location, elevation, and/or characteristics of the pipeline structure, and transmit information to the signal processing unit 550. The signal processing unit 560 may then generate one or more alerts and/or alarms indicating an increased likelihood of damage to the pipeline or a leak in the pipeline.

Figure 6:
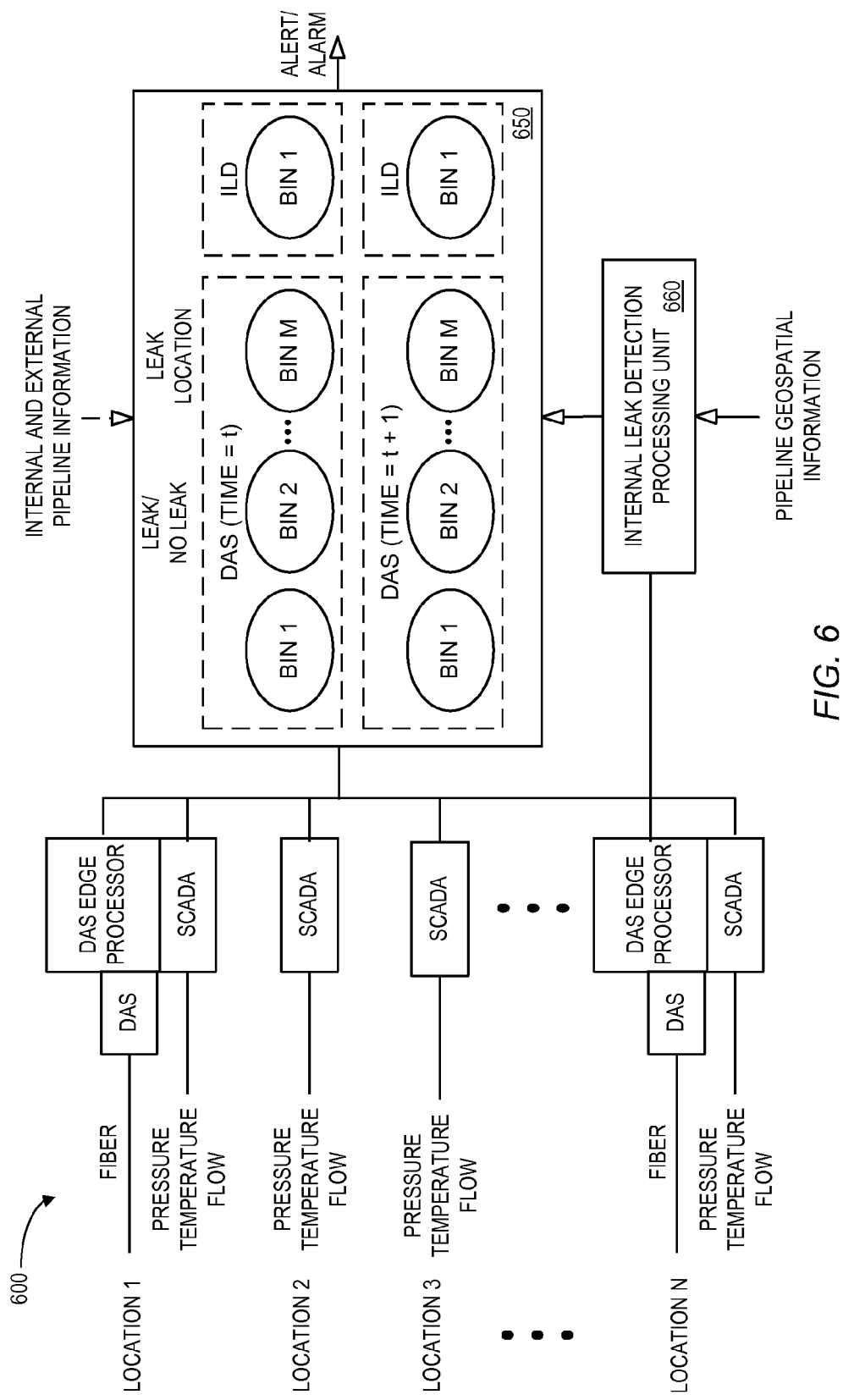
FIG. 6 illustrates a system incorporating a fusion algorithm in accordance with some embodiments.

The signal processing unit 550 may utilize a fusion algorithm to generate alerts based on the acoustic data and collected physical data. For example, FIG. 6 illustrates a system 600 incorporating a fusion algorithm in accordance with some embodiments. In particular, a signal processing unit 650 receives acoustic data, collected physical data, and information from an ILD processing unit 660. For time t, a Bayesian network diagram may provide one or more bins (e.g., bins 1 through M) for the acoustic measurements and the ILD data. Similar bins may be provided for time t+1, etc. The hidden states in the Bayesian network represent the binary variable (leak/no leak) and the leak location, respectively. The relationships between the states and the measurements are specified by the underlying statistical model which can be tuned using the training data. Once armed with the Bayesian network one can then run a Bayesian Network propagation algorithm to calculate the probability distributions of the nodes representing the hidden states to be estimated. In this way, the signal processing unit 650 may generate a leak/no leak indication along with a leak location to be included in an alert.

Figure 7:
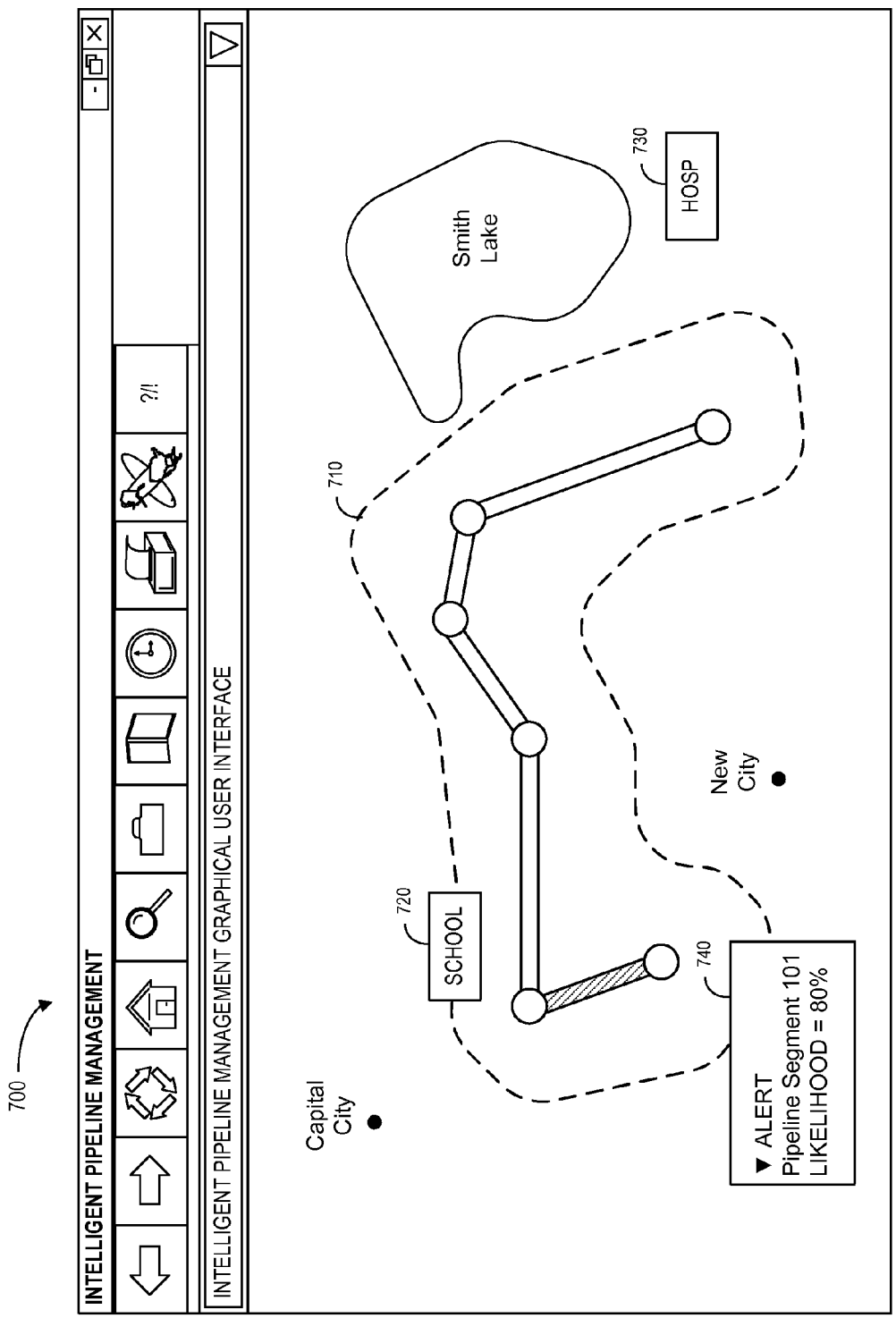
FIG. 7 illustrates a pipeline alert or alarm on a display according to some embodiments.

According to some embodiments, a user may select one of the locations and/or alerts (e.g., with his or her computer mouse pointer icon) to view more information about that particular pipeline data. For example, FIG. 7 illustrates a display 700 according to some embodiments. The display 700 includes a region 710 around the pipeline, such as a region associated with a Right Of Way ("ROW") high consequence area or danger zone. The display 700 further shows locations of interest, such as a school 720 and hospital 730, along with one or more alerts 740. Note that the display 700 illustrated in FIG. 7 includes a map overlaid with graphical representations of a pipeline that include actual pipe segments along with other pipeline assets. Note that risk information about various segments of the pipelines may also be included on the display 700 (e.g., low risk segments may be displayed as green or high risk segments may be displayed with crosshatching as illustrated in FIG. 7. According to some embodiments the display 700 further includes information about population centers (e.g., cities and towns), geographic features, highways, weather patterns, wildfires, etc.

Thus, embodiments described herein may provide a system for pipeline leak detection that may include a distributed acoustic sensing component, an edge processing unit responsible for extracting features from the acoustic raw data which will be suitable for data fusion, a data network to transfer data to a control station, a SCADA system for gathering pressure, temperature, and flow data, and/or an ILD system for estimating leak probabilities based on pressure, temperature, and/or flow data, and a signal processing unit which processes and fuses the data from the acoustic and ILD systems to generate leak alarms.

The analytic, implemented in the signal processing unit, may fuse data streams (test statistics) from the distributed acoustic sensing edge processors and ILD systems to determine if a leak alarm should be announced. By fusing data prior to applying thresholds in either the acoustic or ILD systems, leak detection may have more sensitivity and/or reduced false alarms.

According to some embodiments, a SCADA system may gather pressure, temperature, and flow data from sensors positioned along the entire pipeline network and provide this an ILD processing unit. Multiple distributed acoustic sensing edge processing units may pre-process the acoustic measurements and convert them into information suitable for data fusion (which is done at a different stage). An ILD processing unit may measure the deviation between the measured internal pipeline parameters and the expected ones derived using a computational fluid dynamic model together with pipeline geospatial information. A data network may pass data from the distributed systems to the central units (ILD and Signal Processing unit), and a signal processing unit may fuse the data from the distributed acoustic sensing edge processing units and the ILD system.

The fusion method may, according to some embodiments, comprise the following steps:

1. Building a dynamic Bayesian network using the test statistics (which are indicative of a leak) provided by the distributed acoustic sensing edge processing and the ILD system. The hidden nodes in the network may indicate the leak/no leak hypothesis the system wants to test and the leak location, respectively. The observable nodes may denote the test statistics from both systems in each bin or zone the pipe is partitioned into. The probabilistic and causal relationships among the nodes are represented and executed as graphs and can thus be easily visualized and extended, making model building and verification easier and faster.

2. Incorporating "prior" information (e.g., wall thickness) on the zone where the leak is most likely going to occur into the leak location node and propagating this new data point through the inference network.

3. Update the posterior probability of a particular zone containing the leak, using the likelihood function of the measurement points given that the leak hypothesis is true, and applying the Maximum A Posteriori ("MAP") principle.

4. Combining the test statistics from all the nodes together with the posterior probability computed as described above using an optimal Bayesian detector.

According to some embodiments, the proposed algorithm may adapt to changing operating conditions, environments, etc. associated with the pipeline. By continuously estimating and learning the statistical distribution of the test statistics under the different hypothesis (leak vs no leak), one ensures that the detector performance (e.g. false alarms) stays under pre-designed limits by adaptively changing the decision threshold.

Some embodiments described herein may be associated with a Bayesian probabilistic model. A Bayesian model may be used, for example, to make improved pipeline leak detection decisions; it may utilize both sensor features and domain expertise and incorporate prior knowledge of the status of the pipeline from historical records or other information known to the pipeline enterprise (e.g., wall thickness using internal corrosion data). The flexible structure of a Bayesian model may help ensure that the contextual information (e.g., operating conditions of the pipeline) can be integrated in the Bayesian network seamlessly. Some benefits of embodiments described herein may include reduced false alarms, increased response time, and/or improved sensitivity.

Figure 8:
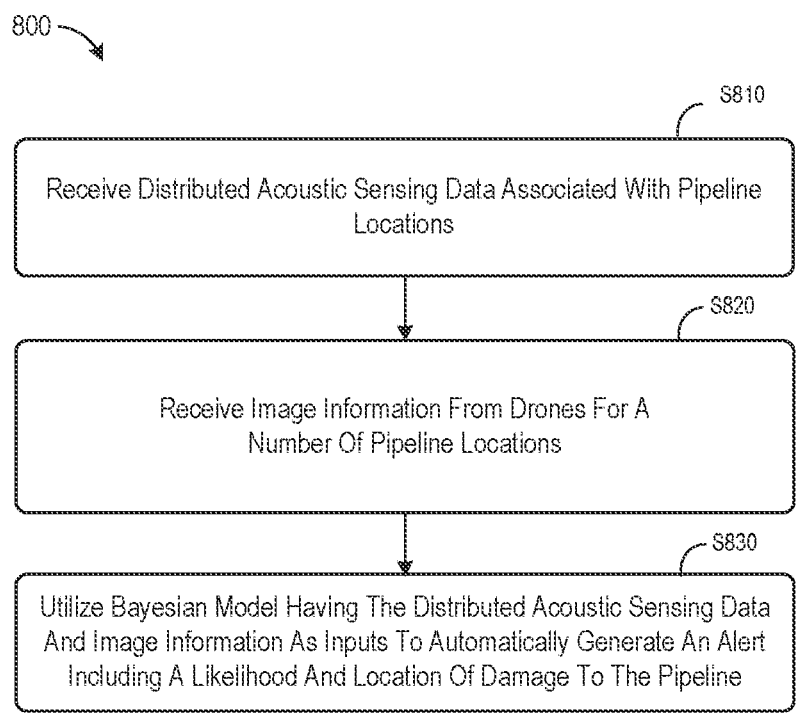
FIG. 8 illustrates an image data method that might be performed in accordance with some embodiments.

In addition to, or instead of, the pressure/temperature/flow information, image information may be fused with the acoustic data. For example, FIG. 8 illustrates an image data method 800 that might be performed in accordance with some embodiments.

As before, at S810 a signal processing unit may receive distributed acoustic sensing data associated with a first set of a plurality of pipeline locations. The pipeline might transport, for example, a gas (such as propane), a liquid (such as crude or refined oil), or a combination of liquids and solids (e.g., an output of a Stream Assisted Gravity Drainage ("SAGD") production operation).

At S820, the signal processing unit may receive collected physical data representing image information (e.g., pictures and/or video data) collected by drones. At S830, the signal processing unit may utilize a Bayesian model (having the distributed acoustic sensing data and image information as inputs) to automatically generate at least one alert indicating an increased probability of damage to the pipeline. According to some embodiments, the alert may include a likelihood of damage and/or a predicted pipeline location associated with damage. Instead of a drone, image information might instead be collected using a satellite and/or a manned flying vehicle. The image information may be used, according to some embodiments, to detect the presence of a vehicle, a person, and/or construction equipment (e.g., which might inadvertently damage the pipeline).

Figure 9:
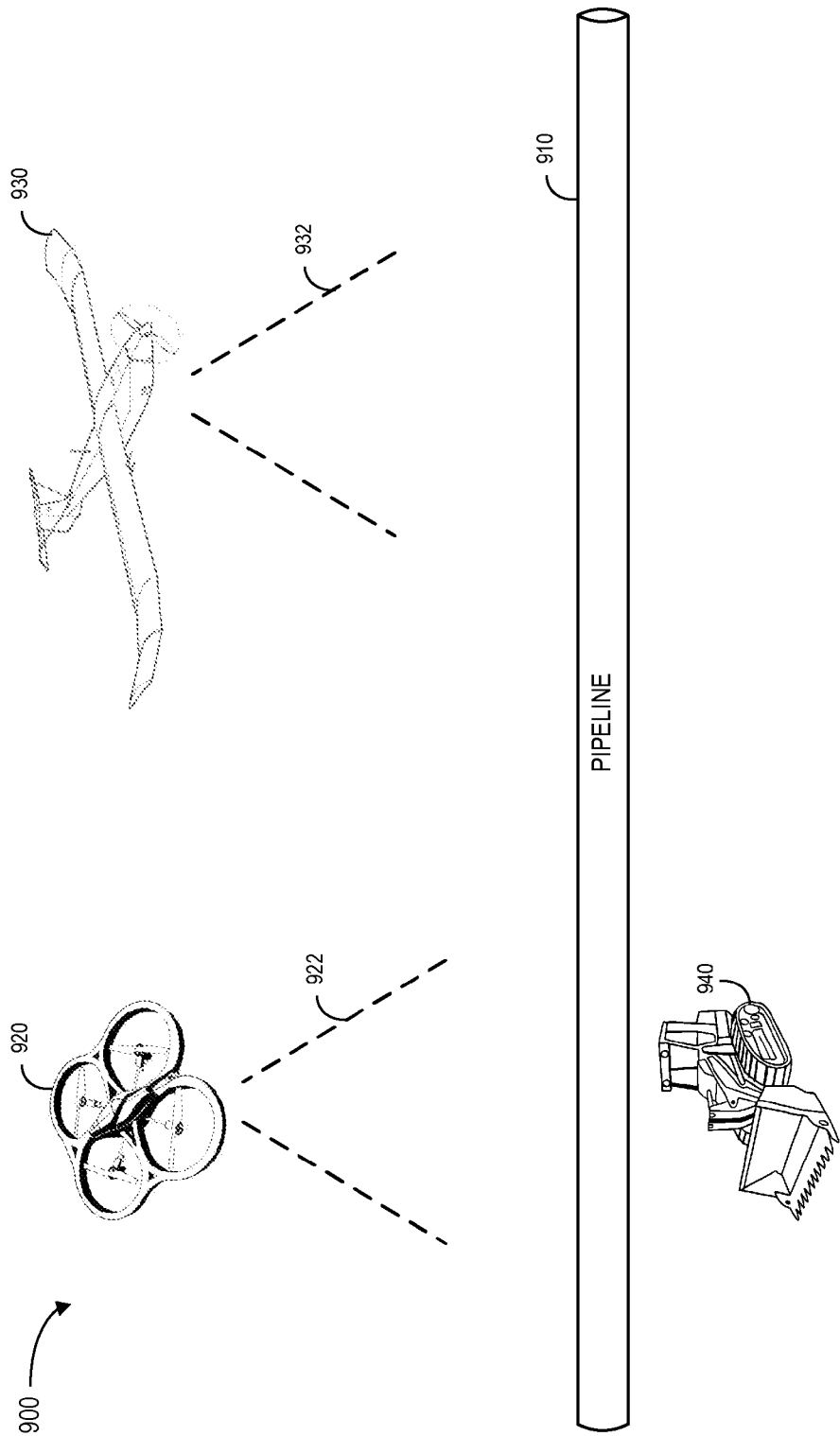
FIG. 9 illustrates a pipeline system according to some embodiments.

FIG. 9 illustrates a pipeline system 900 according to some embodiments. The system 900 includes a pipeline 910 and at least one flying vehicle 920 that captures image information within a field of view 922. According to some embodiments, one or more additional flying vehicles 930 may take pictures of the pipeline 910 within a field of view 932. The images may then be automatically reviewed to detect the presence of, for example, construction equipment 940, leaked oil spills, etc.

Figure 10:
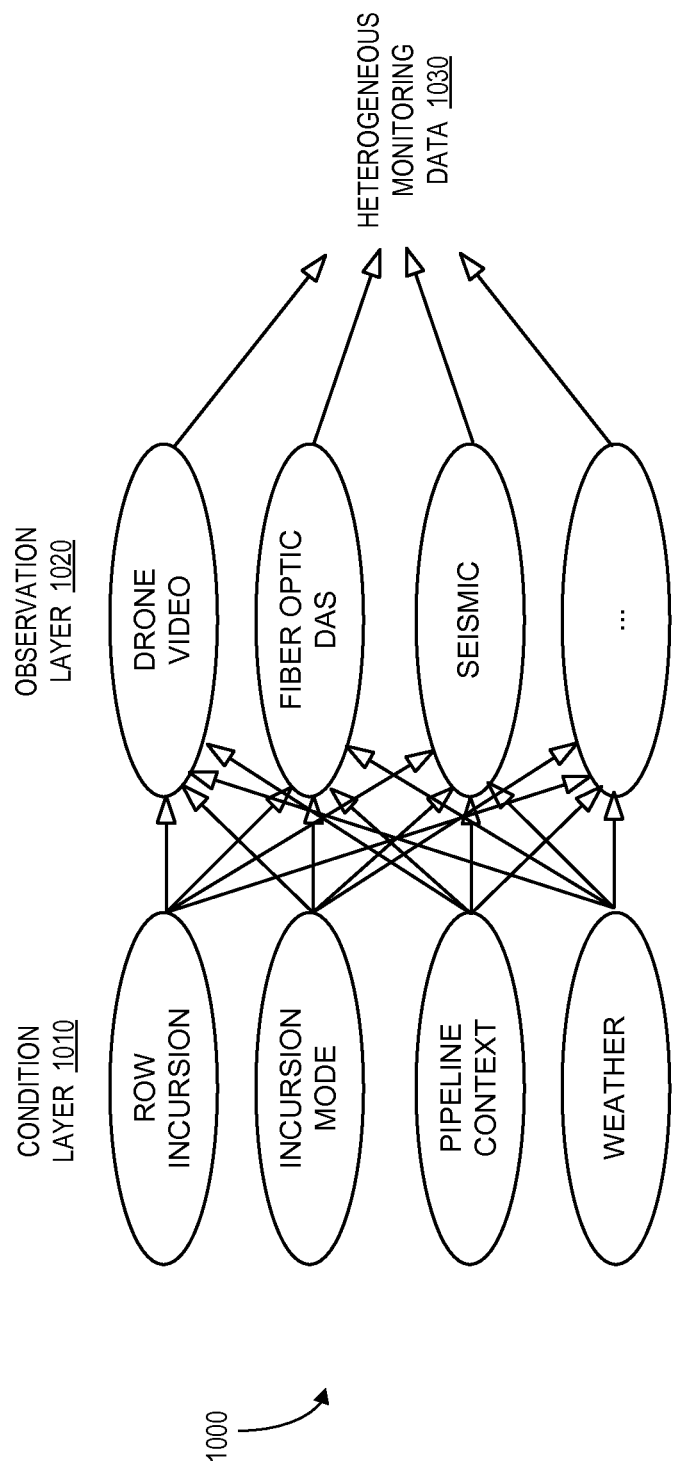
FIG. 10 illustrates an adaptable probabilistic framework in accordance with some embodiments.

FIG. 10 illustrates an adaptable probabilistic framework 1000 in accordance with some embodiments. The framework 1000 includes a condition layer 1010 and an observation layer 1020. The condition layer 1010 includes nodes representing the mode of intrusion and relevant conditions of the pipeline and vicinity, such as ROW incursion, incursion mode (e.g., whether the incursion is by a car, person, etc.), pipeline context (e.g., pipeline elevation, nearby roads, etc.), and weather information. Additional nodes representing other relevant conditions may be added to this layer 1010. The nodes of the condition layer 1010 represent the state of these conditions or a probabilistic representation of the state of these conditions. The observation layer 1020 includes nodes for the different measurement systems, such as drone video, fiber optic distributed acoustic sensing, seismic activing, etc. to provide heterogeneous monitoring data 1030. The nodes of the observation layer 1020 represent the probabilistic outputs of the measurement systems, given the conditions from the condition layer 1010. The layer 1020 models the behavior of the measurement systems under different conditions. Note that traversing the framework 1000 from left to right may be associated with a simulation operation while traversing the framework from right to left may be associated with an interference operation.

Figure 11:
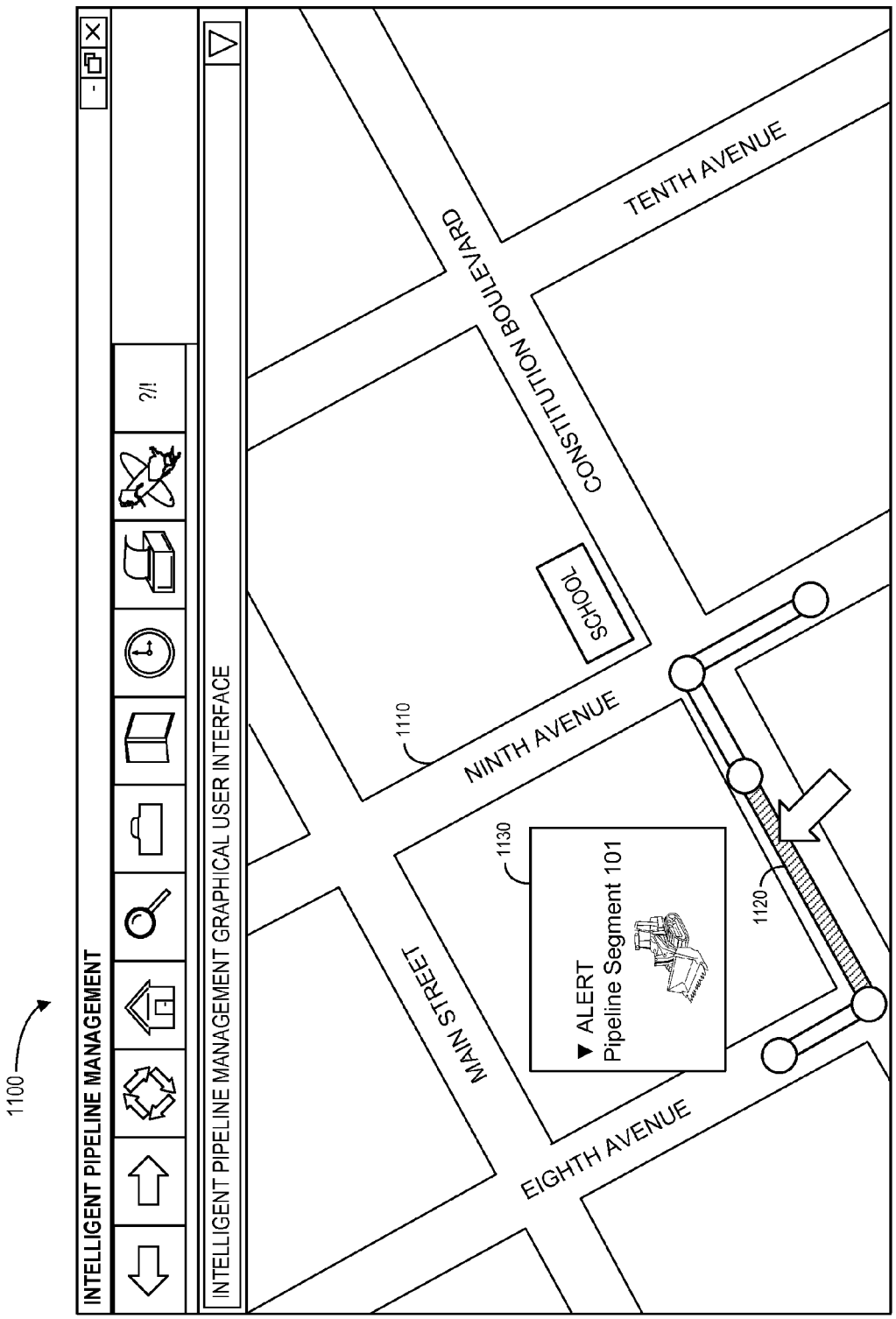
FIG. 11 illustrates an intelligent pipeline management display according to some embodiments.

FIG. 11 illustrates an intelligent pipeline management street view display 1100 in accordance with some embodiments. In this example, the display 1100 includes a street 1110 level map overlaid with a graphical representation of a pipeline 1120, including actual pipe segments and other pipeline assets. Note that risk information about various segments of the pipeline 1120 may also be included on the display 1100 (e.g., high risk segments may be displayed as red or with crosshatching as illustrated in FIG. 11). According to some embodiments, the display 1100 further includes information about geographic features, current traffic data, and other specific areas that may be of concern, such as a school, a hospital, a playground, etc. along with at least one alert 1130 associated with possible damage to the pipeline 1120. Various risk factors associated with the alert 1130 might include, for example, various categories and types of risk, such as mechanical damage, weather/outside force risks, equipment failure, external corrosion, internal corrosion, construction threats, manufacturing material risk, Stress Corrosion Cracking ("SCC"), etc.

Figure 12:
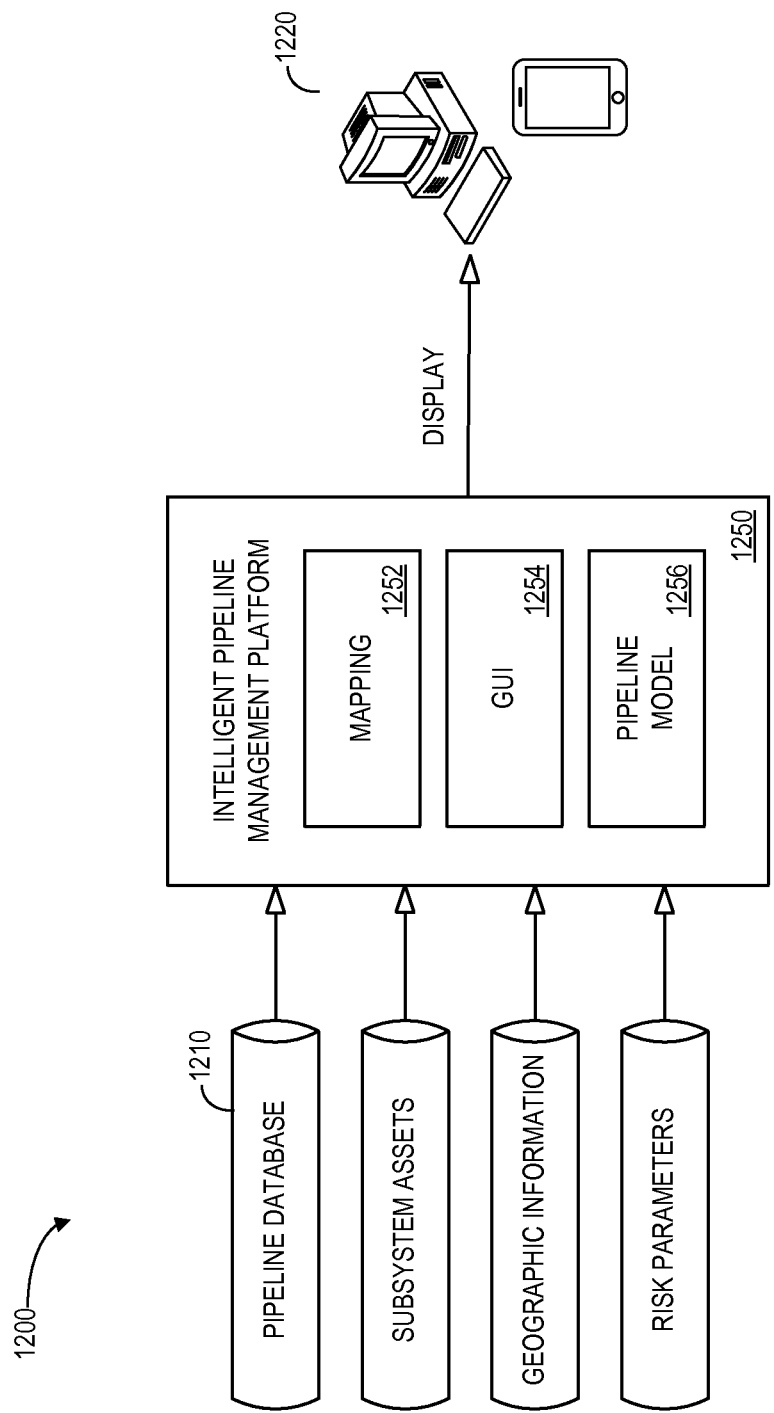
FIG. 12 illustrates an intelligent pipeline management system in accordance with some embodiments.

FIG. 12 is a high-level architecture of a system 1200 in accordance with some embodiments. The system 1200 includes data sources 1210 that provide information to an intelligent pipeline management platform 1250. The data sources 1210 might include, for example a pipeline database storing current and/or historical information about one or more pipeline and/or segments of a pipeline. According to some embodiments, the data sources 1210 include information about subsystem assets, such as pipeline compressor stations, main line valves, meters, etc. The data sources 1210 may further include geographic information, such as map data, topographical data, etc. According to some embodiments, the geographic information may be associated with satellite data and/or a GIS that captures, stores, manipulates, analyzes, manages, and/or presents various types of spatial or geographical data. The data sources 1210 may also include risk parameter information, including acoustic, image information, weather and seismic related risk parameters.

The intelligent pipeline management platform 1250 may, according to some embodiments, access the data sources 1210, execute a mapping module 1252, a graphical user interface module 1254, and/or a pipeline module 1256 (e.g., associated with a fuse algorithm, hydraulic model, and/or risk prediction), and automatically generate displays for various user platforms 1220 as appropriate (including alerts as appropriate).

The intelligent pipeline management platform 1250 may store information into and/or retrieve information from the data sources 1210 and/or user platforms 1220. The data sources 1210 may be locally stored or reside remote from the intelligent pipeline management platform 1250. Although a single intelligent pipeline management platform 1250 is shown in FIG. 12, any number of such devices may be included. Moreover, various devices described herein might be combined according to embodiments of the present invention. For example, in some embodiments, the intelligent pipeline management platform 1250 and data sources 1210 might comprise a single apparatus.

Such a system 1200 may be used to implement a tool to combine real-time and off-line data using a probabilistic model. This may improve threat detection through use of multiple heterogeneous data sources. The system 1200 may let a pipeline enterprise make informed decisions about which system defense tool or tools will make measurable improvements in safety and environmental protection for pipelines. The system 1200 may combine data from multiple sources, such as video (the "eyes" of the system 1200) and acoustic (the "ears" of the system 1200), although other data may be included to improve performance—such as historical and geographic data.

Note that excavation damage to gas and hazardous liquid pipelines has, and continues to be, one of the largest sources of fatalities, injuries, and releases compared to other causes. Damage continues to occur despite extensive mapping, damage prevention, and surveillance processes and procedures put into place by pipeline operators. Distributed acoustic sensing, video surveillance, satellite imagery, and/or geophones may all be able to provide information to the system 1200. Moreover, the system 1200 may consume substantial quantities of such data to maximize detectability while minimizing false alarms.

Two complimentary video surveillance approaches to threat detection might be implemented. The first approach is based on object detectors to detect specific objects of interest such as backhoes, trucks and large trailers. The system 1200 may input video captured by an aerial drone and scan images using a sliding window detector on a frame by frame basis. Training data might be used to construct object detectors. This data is composed of two types: positive images which contain objects of interest and negative images which do not contain such objects. Given this data, discriminative machine learning methods, such as region moments, can be used to construct the required image classifier.

The second approach utilizes change detection and classification for the purposes of identifying activity which could be a precursor to damage such as a Bayesian object-level change detection. Given multiple video sequences of the same site taken over different periods of time, the following steps may be performed:

a) registration between videos allowing for pixel to pixel mapping between the sequences, b) change detection between aligned videos which identifies significant changes that may have taken place between capture times and c) change classification which attempts to discriminate between changes due to construction and innocuous changes that naturally occur.

In order to train and evaluate the two video surveillance approaches, video data that is representative of the expected terrain as well as the possible incursion objects/sites of interest may be required.

Distributed fiber sensing systems have attributes that make them very attractive for pipeline defense. Optical fibers are passive and can be deployed many tens of miles with active electronics and optics only at the end points. Compared to patrols and video-surveillance, the distributed fiber can remain on all the time for continuous protection.

A distributed acoustic sensing (DAS) instrument sends light pulses into a fiber cable deployed along a pipeline. Light scattered back from the fiber is recombined and processed to detect acoustics and dynamic strain. When a disturbance occurs above ground such as a backhoe nearing, the acoustic sensing can detect the disturbance, and because the round trip speed of light is known, the disturbance can be located to a distance within a few meters. According to some embodiments, a spectral change detection analytic for subsea and/or land-based pipeline leak detection using acoustic sensing may be employed. A spectral change detection method might, for example, measure the acoustic energy spectrum at each location (e.g., every 5 m) and builds a statistical model of the normal background acoustic spectrum for that region. When the acoustic signal deviates from the background model with both statistical and practical significance, an alert is generated. The system can be enhanced to respond strongly to specific known signatures such as engines, ground impact, and back-up beepers.

For damage prevention, some embodiments described herein may incorporate multiple sensing technologies and optimally utilize all available information. The system may integrate a wide variety of data sources, from real-time acoustic sensing to scheduled drone fly-overs, to geographic data.

Some embodiments may utilize a probabilistic system model to evaluate excavation damage threat detection performance (sensitivity, repeatability, false alarms) of such multi-technology systems. For individual monitoring technologies, the model may capture threat detection performance across all pipeline deployment environments (terrain, local development conditions) and modes of incursion (active excavation, imminent excavation). The system-level model may join individual sensor probabilistic models into a single framework.

The probabilistic model for pipeline protection may be associated with two modes of use:

First, the model may be used to make improved pipeline threat detection decisions given heterogeneous and ambiguous data and information. This is inference of threat.

Second, in a forward simulation mode, the system-level model may estimate threat detection performance. This may allow for "what if" analysis. Moreover, the model may acts as a design tool to help improve threat detection performance and cost.

Figure 13:
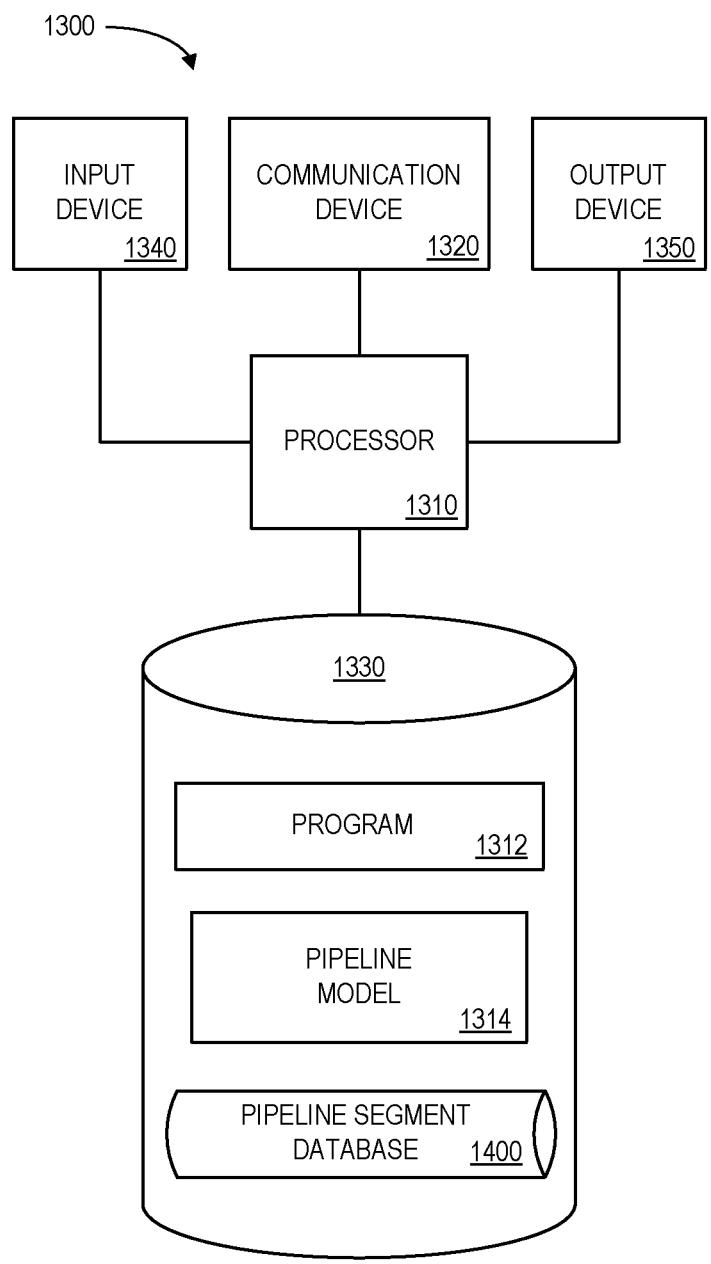
FIG. 13 is block diagram of an intelligent pipeline management platform according to some embodiments of the present invention.

The embodiments described herein may be implemented using any number of different hardware configurations. For example, FIG. 13 is block diagram of an intelligent pipeline management platform 1300 that may be, for example, associated with the system 100 of FIG. 1 and/or the system 1200 of FIG. 12. The intelligent pipeline management platform 1300 comprises a processor 1310, such as one or more commercially available Central Processing Units (CPUs) in the form of one-chip microprocessors, coupled to a communication device 1320 configured to communicate via a communication network (not shown in FIG. 13). The communication device 1320 may be used to communicate, for example, with one or more remote user platforms. The intelligent pipeline management platform 1300 further includes an input device 1340 (e.g., a computer mouse and/or keyboard to input adaptive and/or predictive modeling information) and an output device 1350 (e.g., a computer monitor to display alerts and/or reports). According to some embodiments, a mobile device and/or voice activated messages may be used to exchange information with the intelligent pipeline management platform 1300.

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or a pipeline model 1314 for controlling the processor 1310. The processor 1310 performs instructions of the programs 1312, 1314, and thereby operates in accordance with any of the embodiments described herein. For example, the processor 1310 may receive distributed acoustic sensing data associated with a first set of a plurality of pipeline locations. The processor 1310 may also receive collected physical data representing a physical characteristic of a second set of a plurality of pipeline locations. The processor 1310 may then utilize a pipeline model having the distributed acoustic sensing data and collected physical data as inputs to automatically generate at least one alert indicating an increased probability of damage to the pipeline.

The programs 1312, 1314 may be stored in a compressed, uncompiled and/or encrypted format. The programs 1312, 1314 may furthermore include other program elements, such as an operating system, clipboard application a database management system, and/or device drivers used by the processor 1310 to interface with peripheral devices.

As used herein, information may be "received" by or "transmitted" to, for example: (i) the intelligent pipeline management platform 1300 from another device; or (ii) a software application or module within the intelligent pipeline management platform 1300 from another software application, module, or any other source.

In some embodiments (such as shown in FIG. 13), the storage device 1330 stores a pipeline segment database 1400. An example of a database that may be used in connection with the intelligent pipeline management platform 1300 will now be described in detail with respect to FIG. 14. Note that the database described herein is only one example, and additional and/or different information may be stored therein. Moreover, various databases might be split or combined in accordance with any of the embodiments described herein.

Figure 14:
FIG. 14 is a tabular portion of a pipeline segment database according to some embodiments.

Referring to FIG. 14, a table is shown that represents the pipeline segment database 1400 that may be stored at the intelligent pipeline management platform 1300 according to some embodiments. The table may include, for example, entries identifying pipes and other pipeline assets associated with one or more pipelines. The table may also define fields 1402, 1404, 1406, 1408, 1410 for each of the entries. The fields 1402, 1404, 1406, 1408, 1410 may, according to some embodiments, specify: a pipeline segment identifier 1402, distributed acoustic sensing data 1404, physical data 1406, image data 1408, and alert status 1410. The component database 1400 may be created and updated, for example, when an intelligent pipeline management platform is created and/or as information is received from a sensor, etc.

The pipeline identifier 1402 may be, for example, a unique alphanumeric code identifying a particular pipeline along with a particular portion of pipe or other pipeline asset. The distributed acoustic sensing data 1404 might be collected via fibers and/or edge processors. The physical data 1406 might be collected via SCADA devices, and the image data 1408 may be collect by drones carrying cameras. The acoustic sensing data 1404, physical data 1406, and image data 1408 might be processed via a fusion algorithm to create the alert stats 1410 for each pipeline segment.

Thus, some embodiments may provide an automatic and efficient way of predicting and/or displaying pipeline location and/or risk information to a user. Embodiments may provide a unique interface consolidating functionality and view data on different display and/or platforms to make user interaction simple and efficient. According to some embodiments, integrate modal (or "popup") windows may provide alert data, enabling users to view both the location/street environment of pipeline assets and/or a three dimensional visualization of anomalies and structural risks within a pipeline segment. Moreover, a geospatial view of a pipeline network and associated assets may enable convergence of disparate data sets (e.g., compressor stations, valves, and critical local structures such as schools) in one location for network awareness and understanding.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a pipeline, comprising:
a pipeline geospatial database storing information about a plurality of pipeline locations associated with the pipeline, each pipeline portion being adapted to provide transport of a sub stance;
a signal processing unit coupled to the pipeline geospatial database, to:
receive distributed acoustic sensing data associated with a first set of a plurality of pipeline locations,
receive collected physical data representing a physical characteristic of a second set of a plurality of pipeline locations, and
utilize a pipeline model having the distributed acoustic sensing data and collected physical data as inputs, wherein the acoustic sensing data and the collected physical data is fused, and automatically generate at least one alert; and
a communication port coupled to the signal processing unit to transmit information creating for a user a visual representation of the alert indicating an increased probability of damage to the pipeline, wherein the alert comprises predictive risk information associated with at least one of the pipeline locations, wherein the predictive risk information is based at least in part on a volume of the substance transported via the pipeline portion and on a prior failure after transporting a certain amount of the substance.

2. The system of claim 1, wherein the physical data is associated with at least one of: (i) a pressure, (ii) a temperature, and (iii) a flow of the substance.

3. The system of claim 2, wherein the substance comprises at least one of: (i) a liquid, and (ii) a gas.

4. The system of claim 1, wherein the physical data comprises image information.

5. The system of claim 4, wherein the image information is associated with at least one of: (i) pictures, and (ii) video data.

6. The system of claim 4, wherein the image information is collected via at least one of: (i) a drone, (ii) a satellite, and (iii) a manned flying vehicle.

7. The system of claim 4, wherein the pipeline is adapted to provide transport of at least one of: (i) a liquid, (ii) a gas, and (iii) a solid.

8. The system of claim 1, wherein the signal processing unit is associated with an intelligent pipeline monitoring platform that includes:
an analytic module, having access to historical pipeline information, to generate predictive risk information associated with at least one of the pipeline locations.

9. The system of claim 1, wherein a graphical user interface map display includes the alert and further includes at least one of: (i) topographical information, (ii) a geographic feature, (iii) street information, (iv) population information, (v) weather information, (vi) seismic information, (vii) building information, and (viii) predicted impact radius information.

10. A method for protecting a pipeline adapted to provide transport of a substance, comprising:
receiving, at a signal processing unit, distributed acoustic sensing data associated with a first set of a plurality of pipeline locations;
receiving, at the signal processing unit, collected physical data representing a physical characteristic of a second set of a plurality of pipeline locations;
utilizing, by the signal processing unit, a pipeline model having the distributed acoustic sensing data and collected physical data as inputs, wherein the acoustic sensing data and the collected physical data is fused, to automatically generate at least one alert indicating an increased probability of damage to the pipeline, wherein the alert comprises predictive risk information associated with at least one of the pipeline locations, wherein the predictive risk information is based at least in part on a volume of the substance transported via the pipeline and on a prior failure after transporting a certain amount of the substance.

11. The method of claim 10, wherein the distributed acoustic sensing data is based on signals received via optical fibers or geophones and processed by an edge processing device.

12. The method of claim 10, wherein the alert includes at least one of: (i) a likelihood of damage, and (ii) a predicted pipeline location associated with damage or a leak.

13. The method of claim 10, wherein the pipeline is adapted to provide transport of a substance and the physical data is associated with at least one of: (i) a pressure, (ii) a temperature, and (iii) a flow of the substance.

14. The method of claim 13, wherein the substance comprises at least one of: (i) a liquid, (ii) a gas, and (iii) a solid.

15. The method of claim 13, wherein the physical data is processed by a supervisory control and data acquisition device prior to being received by the signal processing unit.

16. The method of claim 13, wherein the physical data is analyzed based at least in part on geospatial information describing the pipeline and a substance simulation algorithm associated with an internal leak detection system.

17. The method of claim 10, wherein the physical data comprises image information.

18. The method of claim 17, wherein the image information is associated with at least one of: (i) pictures, and (ii) video data.

19. The method of claim 17, wherein the image information is collected via at least one of: (i) a drone, (ii) a satellite, and (iii) a manned flying vehicle.

20. The method of claim 17, wherein the pipeline is adapted to provide transport of at least one of: (i) a liquid, (ii) a gas, and (iii) a solid.

21. The method of claim 17, wherein the image information is used detect the presence of at least one of: (i) a vehicle, (ii) a person, and (iii) construction equipment.

22. The method of claim 10, wherein the pipeline model is associated with at least one of: (i) a predictive model, (ii) a Bayesian model, (iii) a neural network, (iv) a Hidden Markov model, (v) an expert system, (vi) a decision tree, (vii) a collection of decision trees, (viii) a support vector machine, and (ix) weighted factors.

23. A non-transitory, computer-readable medium storing instructions that, when executed by a computer processor, cause the computer processor to perform a method associated with a method to protect a pipeline adapted to provide transport of a substance, the method comprising:
receiving, at a signal processing unit, distributed acoustic sensing data associated with a first set of a plurality of pipeline locations;
receiving, at the signal processing unit, collected physical data representing a physical characteristic of a second set of a plurality of pipeline locations;
utilizing, by the signal processing unit, a pipeline model having the distributed acoustic sensing data and collected physical data as inputs, wherein the acoustic sensing data and the collected physical data is fused, to automatically generate at least one alert indicating an increased probability of damage to the pipeline, wherein the alert comprises predictive risk information associated with at least one of the pipeline locations, wherein the predictive risk information is based at least in part on a volume of the substance transported via the pipeline and on a prior failure after transporting a certain amount of the substance.

* * * * *